Sept. 22, 1942.  R. T. McQUEEN  2,296,531
MEASURING INSTRUMENT
Filed June 3, 1940  2 Sheets-Sheet 1

R. T. McQueen
INVENTOR.
BY
ATTORNEYS.

Sept. 22, 1942.  R. T. McQUEEN  2,296,531
MEASURING INSTRUMENT
Filed June 3, 1940  2 Sheets-Sheet 2
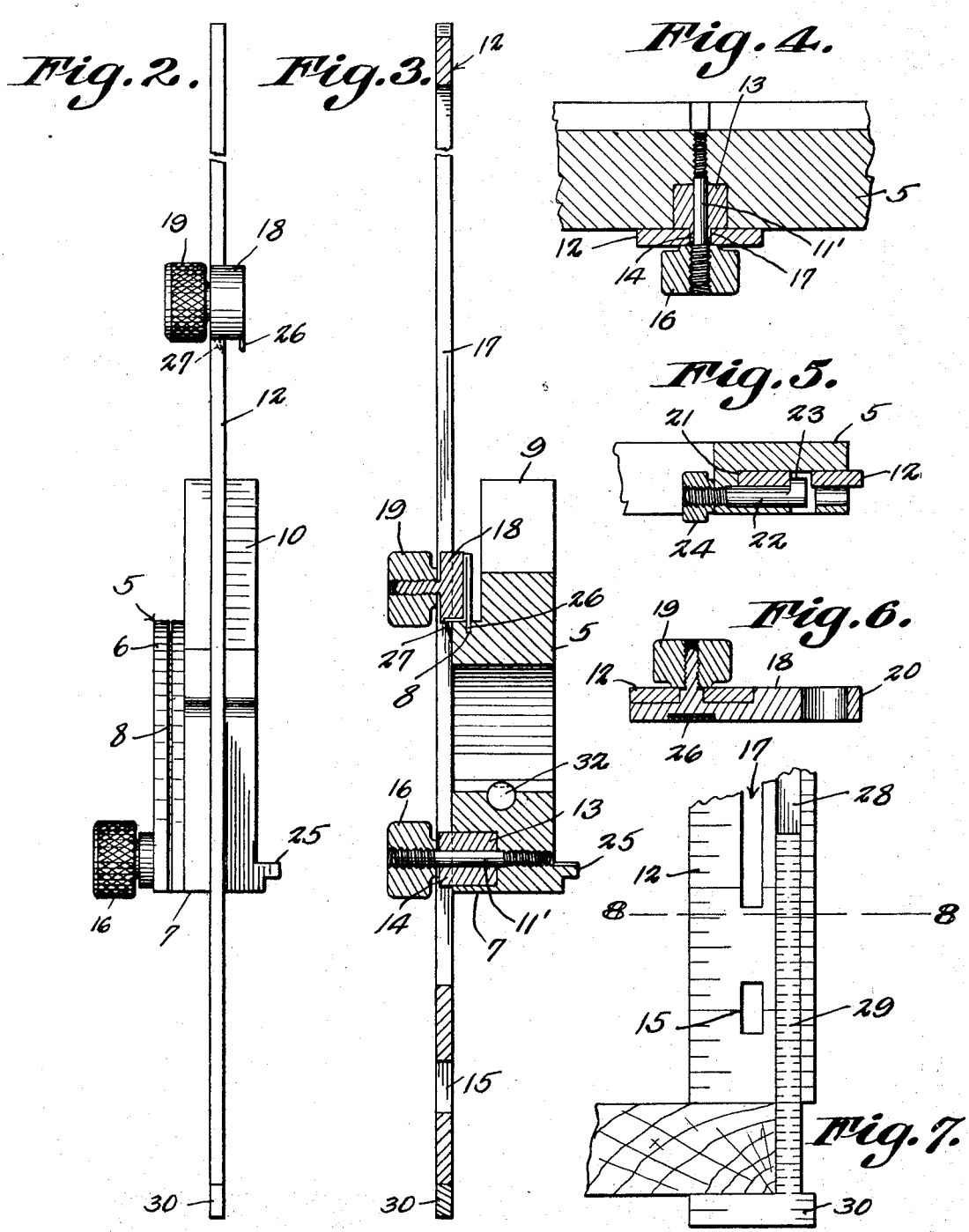
R. T. McQueen
INVENTOR.
BY C. A. Snow & Co.
ATTORNEYS.

Patented Sept. 22, 1942

2,296,531

UNITED STATES PATENT OFFICE 2,296,531

MEASURING INSTRUMENT

Robert T. McQueen, Butler, Tenn.

Application June 3, 1940, Serial No. 338,618

1 Claim. (Cl. 33—75)

This invention relates to measuring instruments of the protractor type, the primary object of the invention being to provide a measuring instrument of this character, constructed in such a way that it may be capable of many uses, such as a miter gauge, tri-square, bevel gauge, center gauging device, level or the like.

An important object of the invention is to provide a measuring device wherein the movable arm thereof may be secured against movement after it has been adjusted for a predetermined measurement, thereby insuring accuracy in the use of the instrument.

Another object of the invention is to provide a measuring instrument wherein the pivoted measuring arm thereof is provided with an adjustable slide formed with an opening for the reception of a pencil, whereby circles and various arcs of circles may be accurately described.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is an edge elevational view of the measuring instrument.

Figure 3 is a longitudinal sectional view of the measuring instrument assembled for describing circles and arcs of circles.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 7 is an elevational view of one end of the removable arm, illustrating the thickness gauge as extended for measuring the thickness of a board.

Figure 8 is a sectional view taken on line 8—8 of Figure 7.

Figure 1:
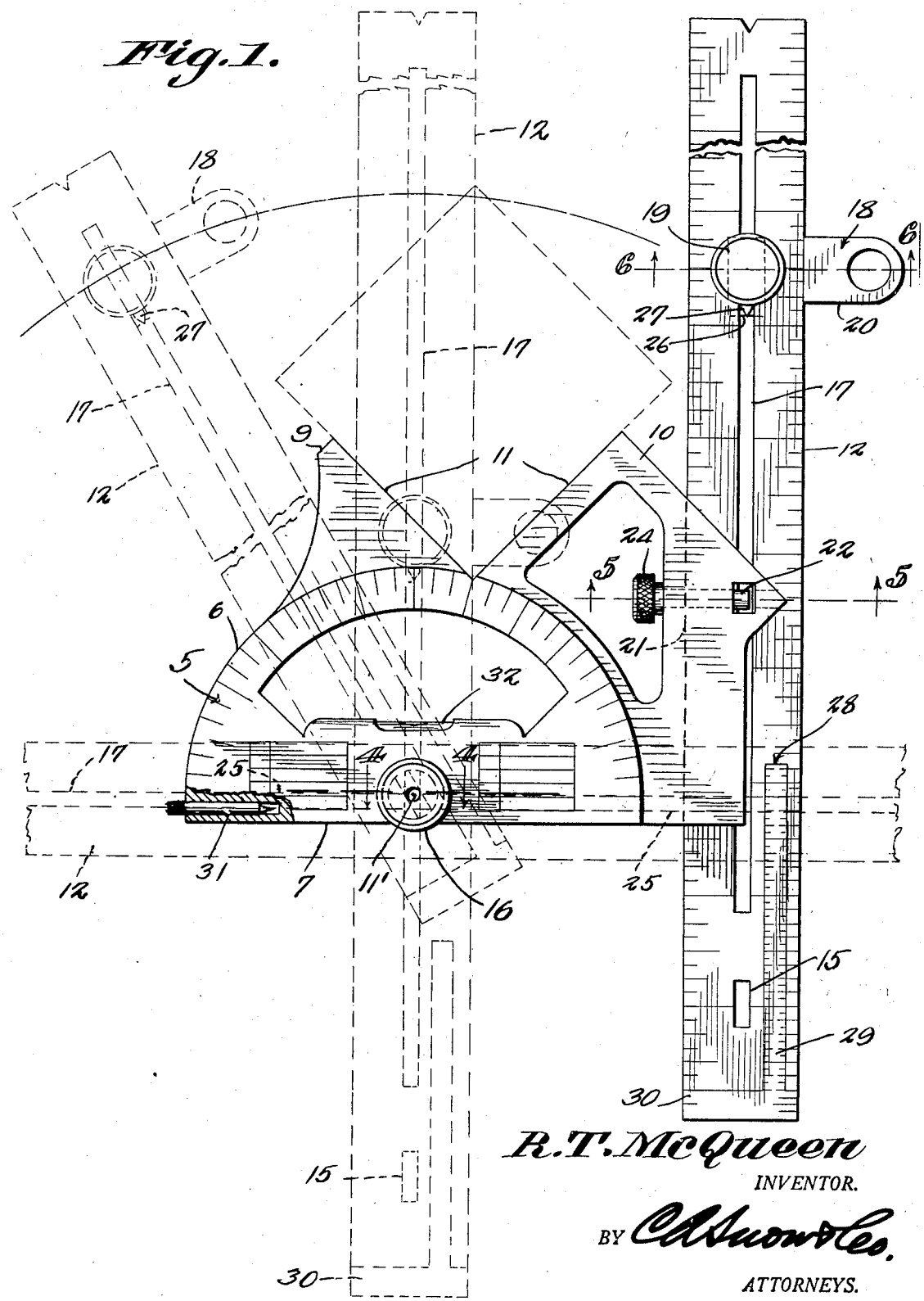
Figure 1 is a plan view of a measuring instrument constructed in accordance with the invention.

Referring to the drawings in detail, the body portion of the instrument is indicated generally by the reference character 5, and as shown presents a curved edge 6 and a straight edge 7, the upper surface of the body portion adjacent to the curved edge being graduated indicating inches and fractions of inches, as clearly shown by Figure 1 of the drawings.

A groove 8 is formed in the curved edge of the body portion and extends throughout the length of the curved edge, the groove being disposed intermediate the upper and lower surfaces of the body portion.

Formed integral with the body portion 5 and extending therefrom, are arms 9 and 10, the arms being substantially wide and formed with right angled surfaces 11 providing a substantially V-shaped head for the reception of square objects to be gauged. These arms 9 and 10 are about one-half of the thickness of the body portion, to the end that a portion of the curved edge 6 is above the arms 9 and 10, for purposes to be hereinafter more fully described.

A pivot screw indicated at 11' is secured to the body portion at a point intermediate the ends of the straight edge 7, and affords means for securing the pivoted measuring arm 12 to the body portion. Mounted on the pivot screw 11', is a bearing 13 which is formed with an elongated extension 14 of a width to fit within the slot 15 of the measuring arm 12. A screw cap 16 is mounted on the outer end of the pivot screw 11' and cooperates with the bearing 13 in clamping the pivoted measuring arm 12 in position.

The pivoted measuring arm 12 is formed with a slot 17 that extends throughout substantially the entire length of the arm 12, the slot accommodating the slide 18 which is provided with a threaded stem that accommodates the nut 19. The nut 19 cooperates with the measuring arm 12 in securing the slide in various positions of adjustment throughout the length of the measuring arm. As clearly shown by the drawings the slide includes a lateral extension arm 20 formed with an opening for the reception of a pencil which describes a circle or arcs of circles, when the pivoted measuring arm is moved with respect to the body portion, as indicated in dotted lines in Figure 1 of the drawings.

At one end of the body portion 5, is a slot providing a straight wall 21 against which one edge of the measuring arm 12 is positioned, when the measuring instrument is to be used as a tri-square. As indicated in full lines in Figure 1 of the drawings, the measuring arm 12 is positioned in the slot and is held against the wall 21, by means of the bolt 22. This bolt 22 is formed with a head 23 which is offset at the inner end of the bolt, the head being designed to fit within the slot 17. A nut 24 is mounted on the threaded end of the bolt 22 and operates to draw the head 23 into close engagement with the measuring arm 12, securing the measuring arm against movement with respect to the body portion 5, to insure accuracy in the use of the measuring instrument, after the measuring blade has been set for a predetermined measurement. When it is desired to release the measuring arm, it is only necessary to loosen the nut 24 and rotate the bolt to move the head out of engagement with the measuring arm. The measuring arm may then be readily slid from its position, or moved to adjust it with respect to the body portion.

A flange indicated at 25 extends downwardly from the body portion and is disposed along the straight edge of the body portion. This flange permits the measuring instrument to be used as a tri-square, the flange being moved against a straight edge of a board or object to be squared.

It might be further stated that the slide 18 is supplied with a wide finger 26 that fits in the groove 8 formed in the curved surface of the body portion. This finger provides a locking means for securing the pivoted measuring arm in various positions of adjustment with respect to the graduations along the curved edge of the body portion, by operating the nut 19 to tighten the nut. An indicator 27 forms a part of the finger 26, and cooperates with the graduations formed along the curved edge of the body portion, so that the pivoted measuring arm may be accurately adjusted with respect to the graduations.

A slot indicated at 28 is formed in the upper surface of the measuring arm 12, and extends inwardly from one end thereof. This slot 28 accommodates the rule 29 which is provided with a head 30 at one end thereof, the head 30 being of a length equal to the width of the measuring arm 12, as shown by Figure 7 of the drawings. This rule may be extended to a position as shown by Figure 7 of the drawings for use in measuring thickness of boards.

An opening is formed in one side of the body portion, for the reception of the center pin 31 which is pointed, so that when the device is used in describing a circle, the pivot screw 11 may be removed, and the pin 31 inserted in the opening, in place of the screw. The pointed end of the pin 31 may now be pressed into the surface of the board or article on which the circle is to be described.

In order that the device may be used as a level, the body portion is provided with a recess to hold the level tube 32. It will be obvious that by positioning the straight edge of the body portion on an article, the board or article may be readily leveled.

When the device is to be used as a tri-square, the pivoted measuring arm 12 is positioned as shown in full lines in Figure 1 of the drawings. The body portion of the measuring instrument acts as the head of the tri-square, and the arm may be adjusted to various lengths.

When the device is to be used for describing circles, the measuring arm is removed from its position as shown in full lines in Figure 1, and positioned as shown in dotted lines. With one end of the measuring arm held on the body portion, the arm may be readily swung over the graduations of the body portion, so that circles and arcs of circles may be accurately described.

What is claimed is:

A measuring instrument comprising a body portion having a straight edge and a curved edge, the curved edge having a groove formed throughout the length thereof, a measuring arm having a slot formed throughout substantially the entire length thereof, a pivot member extending through the slot and embedded in the body portion, adapted to pivotally connect the arm to the body portion, a slide operating in the slot at a point between the outer curved surface of the body portion and the free end of the arm, an extension on the slide formed with an opening for the reception of a marking member, a finger on the slide movable in the groove in the curved surface of the body portion, means on the slide cooperating with the finger for clamping the slide and arm to the body portion, said means embodying a screw and nut, and said screw and nut adapted to hold the slide in various positions of adjustment throughout the length of the arm whereby curved lines defining the arcs of circles, may be made when the arm is pivoted with respect to the body portion.

ROBERT T. McQUEEN.